United States Patent
Kalczynski et al.

(10) Patent No.: US 7,607,689 B2
(45) Date of Patent: Oct. 27, 2009

(54) AIR BAG VENT WITH TETHER

(75) Inventors: Colleen Kalczynski, Shelby Township, MI (US); Alex Meduvsky, Romeo, MI (US)

(73) Assignee: TRW Vehicle Safety Systems, Inc., Washington, MI (US)

( * ) Notice: Subject to any disclaimer, the term of this patent is extended or adjusted under 35 U.S.C. 154(b) by 354 days.

(21) Appl. No.: 11/494,346

(22) Filed: Jul. 27, 2006

(65) Prior Publication Data
US 2008/0023950 A1    Jan. 31, 2008

(51) Int. Cl.
*B60R 21/239* (2006.01)
(52) U.S. Cl. .................... 280/739; 280/743.2
(58) Field of Classification Search ................. 280/739, 280/743.2, 740
See application file for complete search history.

(56) References Cited

U.S. PATENT DOCUMENTS

| | | | |
|---|---|---|---|
| 6,139,048 | A | 10/2000 | Braunschadel |
| 6,971,671 | B2 * | 12/2005 | Schneider et al. ............ 280/739 |
| 7,328,915 | B2 * | 2/2008 | Smith et al. .................. 280/739 |
| 7,347,450 | B2 * | 3/2008 | Williams et al. ............. 280/739 |
| 2003/0214125 | A1 | 11/2003 | Schneider et al. | 
| 2006/0071461 | A1 | 4/2006 | Williams et al. |
| 2006/0071462 | A1 | 4/2006 | Smith et al. |

FOREIGN PATENT DOCUMENTS

| | | |
|---|---|---|
| DE | 29720461 | 4/1998 |
| DE | 10332549 | 3/2004 |
| JP | 5085295 | 4/1993 |
| WO | 2006041547 | 4/2006 |

* cited by examiner

*Primary Examiner*—Paul N Dickson
*Assistant Examiner*—Nicole Verley
(74) *Attorney, Agent, or Firm*—Tarolli, Sundheim, Covell & Tummino LLP

(57) ABSTRACT

An apparatus (10) for helping to protect an occupant (16) of a vehicle (12) includes an inflatable vehicle occupant protection device (14) that is inflatable to an inflated condition for helping to protect the vehicle occupant. The protection device (14) includes a panel (88) of material that helps define an inflatable volume (26) of the protection device. The panel (88) includes a vent opening (52) that has an open condition for venting inflation fluid from the inflatable volume (26). The vent opening (52) is in the open condition during initial deployment of the protection device (14). A channel (68) encircles the vent opening (52). The channel (68) is at least partially defined by a peripheral portion (62) of the panel (88) that extends along a periphery (54) of the vent opening (52). A tether (80) has a portion (84) that extends through the channel (68). The tether (80) draws together the peripheral portion (62) of the panel (88) to reduce the size of the vent opening (52) when the protection device (14) deploys a predetermined distance toward the inflated condition.

18 Claims, 5 Drawing Sheets

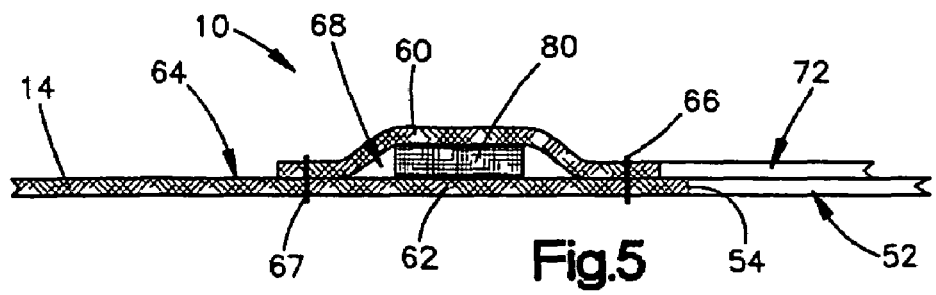
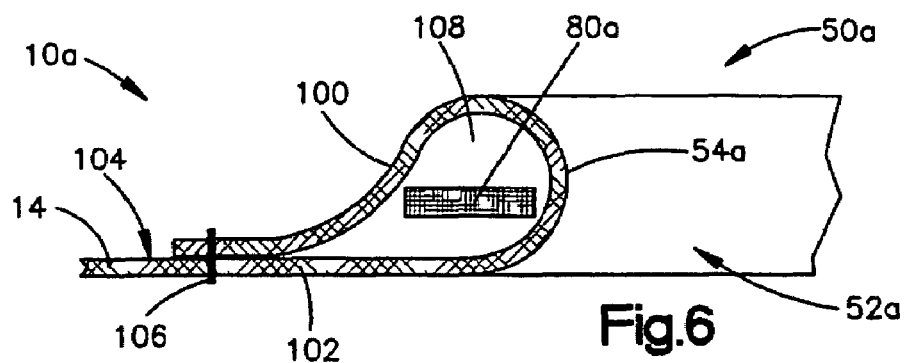
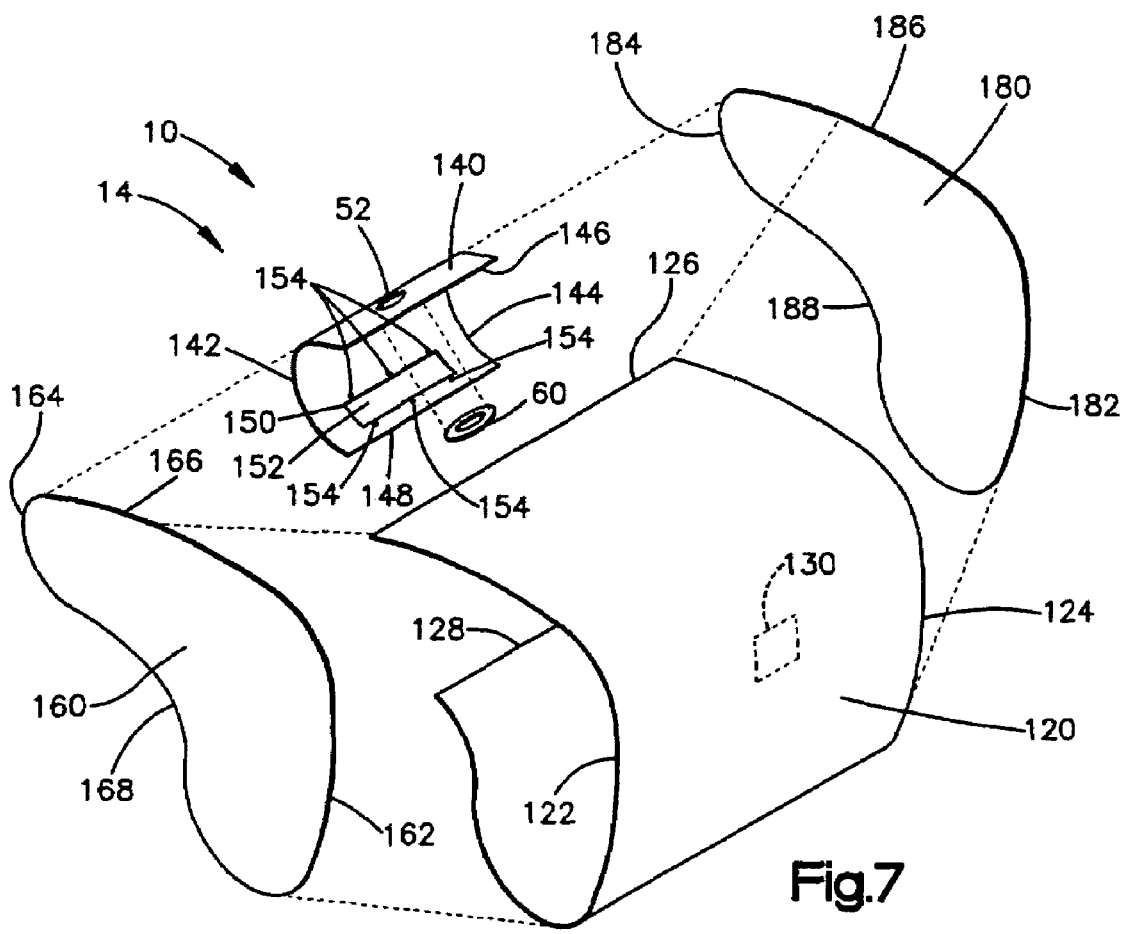

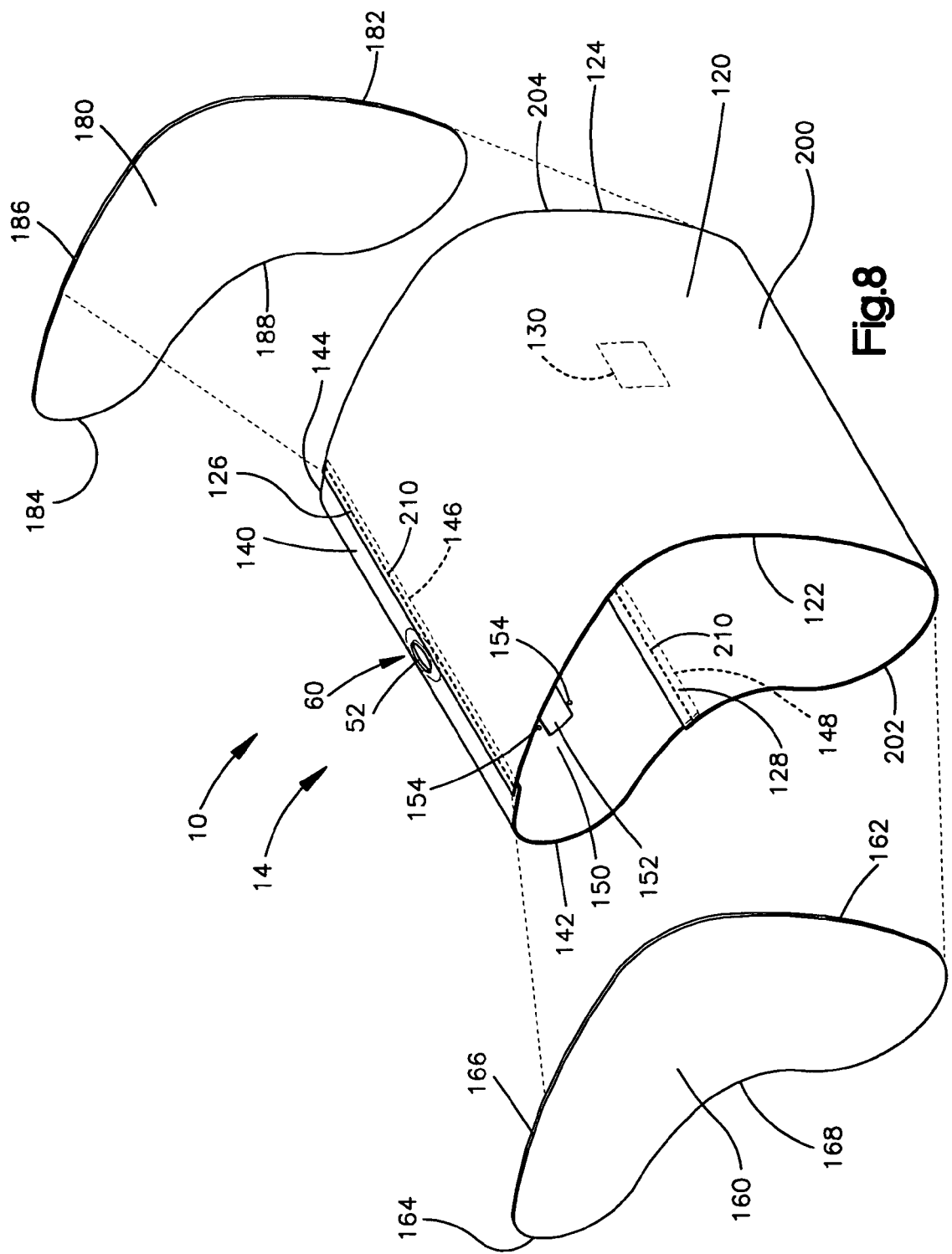

US 7,607,689 B2

AIR BAG VENT WITH TETHER

FIELD OF THE INVENTION

The present invention relates to an inflatable apparatus for helping to protect an occupant of a vehicle.

BACKGROUND OF THE INVENTION

It is known to provide an apparatus for helping to protect a vehicle occupant upon the occurrence of a particular event, such as a vehicle collision. One such apparatus is an air bag module comprising an air bag and an inflation fluid source for providing inflation fluid for inflating the air bag. An air bag module may also include a vent for directing inflation fluid away from the air bag. For example, a vent member may be actuatable to permit or block inflation fluid flow through a vent opening in a housing of the air bag module. Some air bag modules are configured such that the vent opening (a) remains open while the air bag inflates and (b) deploys and closes when the air bag is fully inflated and deployed. This permits inflation fluid flow through the vent opening when an object, such as a vehicle occupant, engages the air bag before it is fully inflated and deployed. This also blocks inflation fluid flow through the vent opening when an object, such as a vehicle occupant, engages the air bag once it is fully inflated and deployed.

SUMMARY OF THE INVENTION

The present invention relates to an apparatus for helping to protect an occupant of a vehicle. The apparatus includes an inflatable vehicle occupant protection device that is inflatable to an inflated condition for helping to protect the vehicle occupant. The protection device includes a panel of material that helps define an inflatable volume of the protection device. The panel includes a vent opening that has an open condition for venting inflation fluid from the inflatable volume. The vent opening is in the open condition during initial deployment of the protection device. A channel encircles the vent opening. The channel is at least partially defined by a peripheral portion of the panel that extends along a periphery of the vent opening. A tether has a portion that extends through the channel. The tether draws together the peripheral portion of the panel to reduce the size of the vent opening when the protection device deploys a predetermined distance toward the inflated condition.

The present invention also relates to an apparatus for helping to protect an occupant of a vehicle. The apparatus includes an inflatable vehicle occupant protection device inflatable to an inflated condition for helping to protect the vehicle occupant. The protection device includes a panel of material that helps define an inflatable volume of the protection device. The panel includes a vent opening that has an open condition for venting inflation fluid from the inflatable volume. The vent opening is in the open condition during initial deployment of the protection device. A tether has a portion that encircles the vent opening. The tether is configured to draw closed the vent opening when the protection device deploys a predetermined distance toward the inflated condition. The panel is subjected to tensile forces resulting from fluid pressures in the inflatable volume. The vent opening is formed in the panel such that the tensile forces act in opposition to closure of the vent opening.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 5 is a sectional view taken generally along line 5-5 in FIG. 4;

FIG. 6 is a sectional view an apparatus for helping to protect an occupant of a vehicle according to a second embodiment of the present invention;

FIG. 7 is an exploded view illustrating an example passenger front impact air bag construction according to the present invention;

FIG. 8 is an exploded view illustrating the air bag of FIG. 7 in a partially assembled condition.

DESCRIPTION OF EMBODIMENTS

Figure 1:
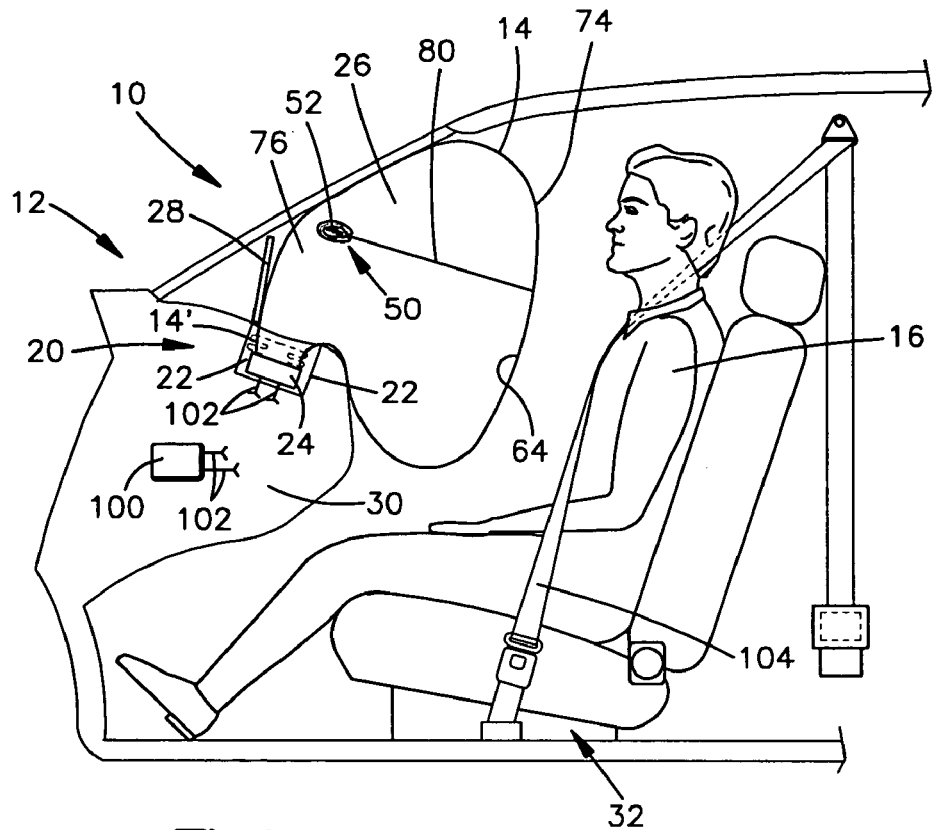
FIGS. 1 and 2 are schematic views of an apparatus for helping to protect an occupant of a vehicle according to a first embodiment of the present invention, illustrating different conditions of the apparatus.
Figure 2:
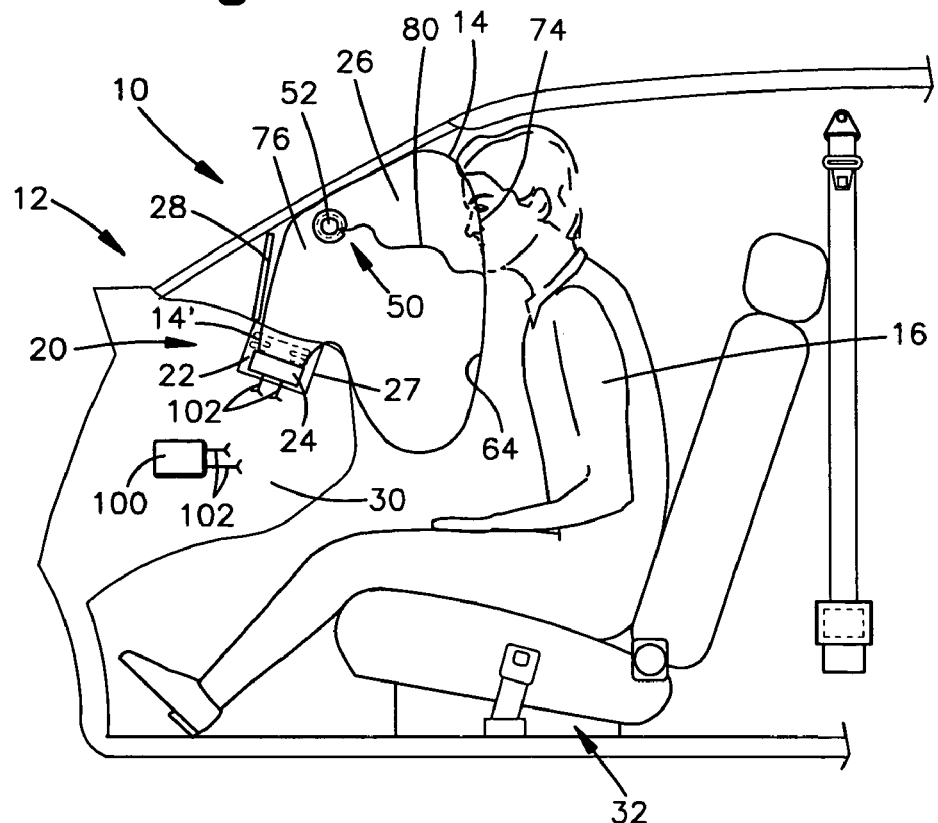

In accordance with the present invention, FIGS. 1 and 2 illustrate an apparatus 10 for helping to protect an occupant 16 of a vehicle 12. The apparatus 10 comprises an air bag module 20 including a vehicle occupant protection device 14 in the form of an air bag. In the embodiment illustrated in FIGS. 1 and 2, the air bag module 20 is a passenger side front air bag module mounted in an instrument panel 30 on a passenger side 32 of the vehicle 12. Those skilled in the art will appreciate that the apparatus 10 may comprise a driver side front air bag module (not shown) mounted on a driver side of the vehicle 12, e.g., on a vehicle steering wheel.

The air bag 14 can be constructed of any suitable material, such as nylon (e.g., woven nylon 6-6 yarns). The air bag 14 may have a one piece woven construction or may include one or more pieces of material that are interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

The air bag module 20 also includes a housing 22 and an inflator 24, supported in the housing, that is actuatable to provide inflation fluid for inflating an inflatable volume 26 of the air bag 14. The housing 22 includes a cover 28 for concealing the air bag 14 in a deflated and stored condition in the housing. The deflated and stored condition of the air bag 14 is illustrated generally at 14' in FIGS. 1 and 2.

The inflator 24 may be of any type or configuration suited to provide inflation fluid to the air bag 14. For example, the inflator 24 may be a pyrotechnic inflator that uses the combustion of gas-generating material to generate inflation fluid. As another example, the inflator 24 may contain a stored quantity of pressurized inflation fluid (not shown) in the form of a gas for inflating the air bag 14. As another example, the inflator 24 could contain a combination of pressurized inflation fluid and ignitable material for heating the inflation fluid. As a further example, the inflator 24 could be of any suitable type or construction for supplying a medium for providing inflation fluid for inflating the air bag 14.

Figure 3:
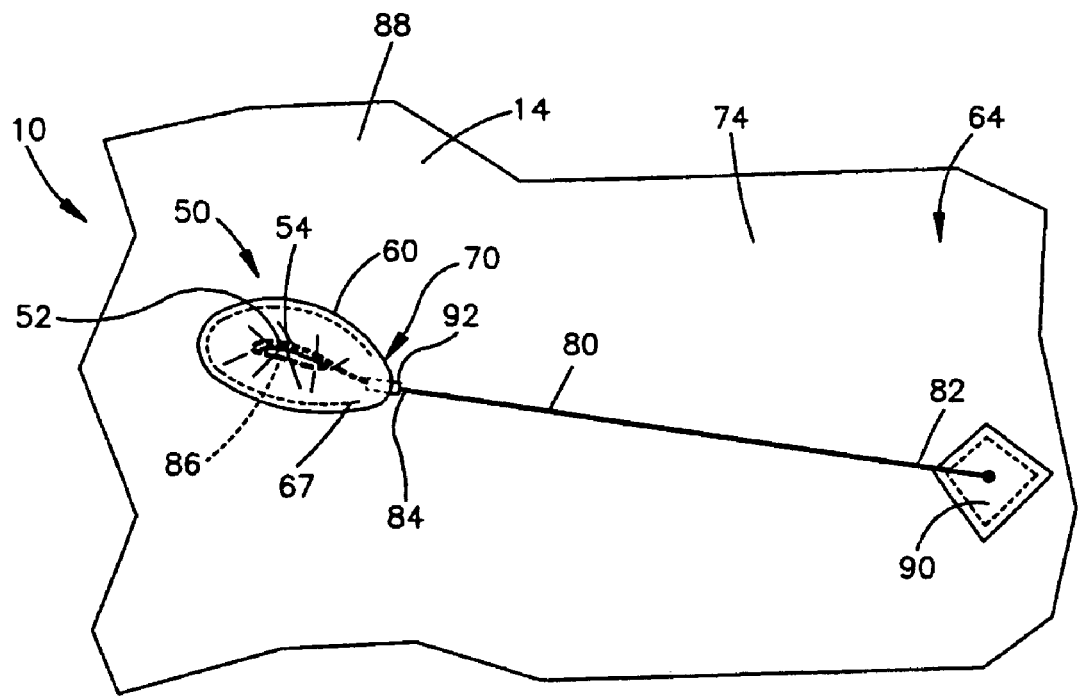
FIG. 3 is a plan view illustrating a portion of the apparatus of FIG. 1.
Figure 4:
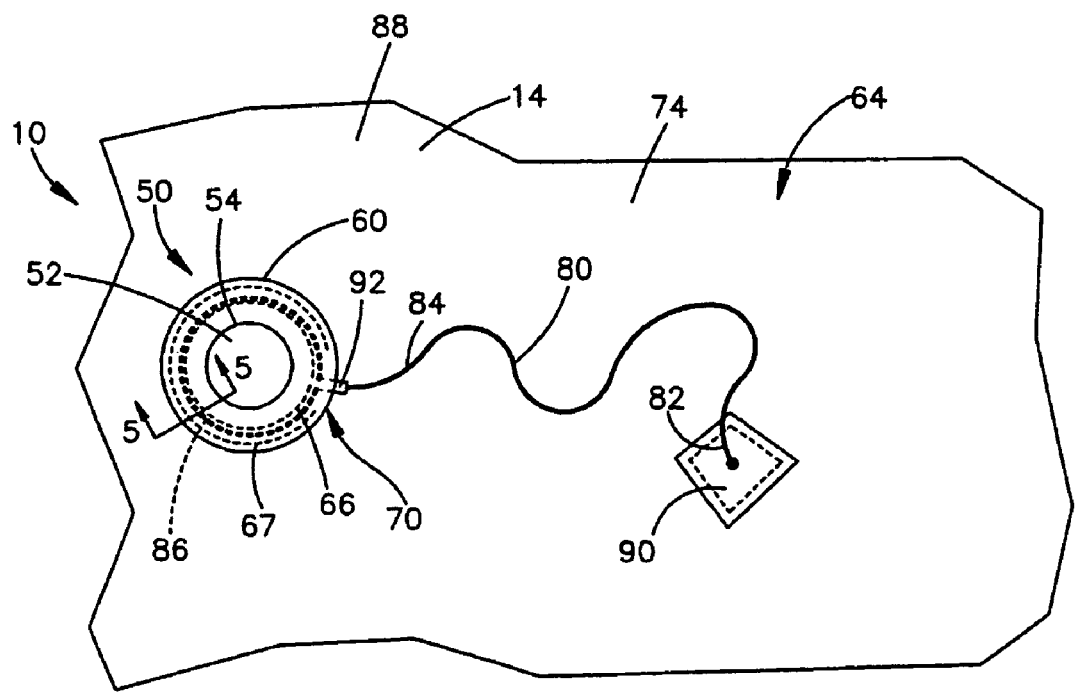
FIG. 4 is a plan view illustrating a portion of the apparatus of FIG. 2.

The apparatus 10 also includes a vent 50 through which inflation fluid may flow from the inflatable volume 26 of the air bag 14. In a first embodiment of the present invention, referring to FIGS. 3-5, the vent 50 includes a vent opening 52, such as a slit or hole, that extends through a panel 88 of the air bag 14, i.e., through the material (e.g., fabric) used to construct the air bag. As shown in FIGS. 3-5, the vent opening 52 has a generally circular shape or configuration. Those skilled in the art, however, will appreciate that the vent opening 52 may have any desired shape or configuration.

As shown in FIGS. 3-5, the vent 50 includes an annular or ring-shaped piece of material 60 that overlies a portion 62 of the air bag material extending around the periphery 54 of the vent opening 52. The piece of material 60 circumscribes the vent opening 52 and overlies the portion 62 of the air bag material on an inner surface 64 of the air bag 14. The piece 60 includes a central opening 72 that coincides with the vent opening 52 when the piece 60 is connected to the portion 62 of the air bag 14. The piece 60 and portion 62 are interconnected by inner and outer connections 66 and 67, respectively, formed by known means, such as stitching, ultrasonic welding, heat bonding, or adhesives. As shown in FIG. 5, the overlying piece 60 and portion 62, when interconnected by the inner and outer connections 66, 67, help define a passage or channel 68 that extends about the periphery 54 of the vent opening 52.

As shown in FIGS. 3 and 4, the inner and outer connections 66, 67 may extend parallel to each other along the ring-shaped piece 60. The inner connection 66 is formed in a complete circular pattern, whereas the outer connection 67 is formed in a semi-circular pattern. The outermost connection 67 has spaced opposite ends that form an opening 70 that provides access to the channel 68.

The apparatus 10 also includes a tether 80 for actuating the vent 50. In the embodiment illustrated in FIGS. 3 and 4, the tether 80 is positioned inside the air bag 14, i.e., in the inflatable volume 26 the air bag. The tether 80 has a first end portion 82 that is connected to the air bag 14 on the inner surface 64 of a portion or panel 74 of the air bag by known means, such as stitching, ultrasonic welding, heat bonding, or adhesives. As shown in FIGS. 1 and 2, the panel 74 is an outer or front panel of the air bag 14 presented generally rearward in the vehicle 12 toward the occupant 16. The first end portion 82 could, however, be connected to the air bag 14 at an alternative location, such as a lateral or side panel of the air bag. A reinforcing piece of material 90 may be used to help bolster the connection between the tether 80 and the air bag panel 74. A second end portion 84 of the tether 80, opposite the first end portion 82, is associated with the vent 50.

The tether 80 may be constructed of any material suited to perform the functions described herein. For example, in one particular construction, the tether 80 may comprise a narrow, elongated strip of fabric material, such as a woven nylon webbing. The tether 80 may also have any configuration suited to perform the functions described herein. For example, in one particular configuration, the tether 80 may have a width of approximately three-eighths of an inch, a thickness of approximately two millimeters, and a length dependent upon the configuration of the air bag 14, the configuration of the vehicle 12, or both.

The second end portion 84 of the tether 80 is configured to form a loop 86 that enters the channel 68 through the opening 70. The loop 86 extends at least partially through the channel 68 and thus at least partially encircles or surrounds the vent opening 52. The loop 86 is configured to have a size or diameter that reduces or constricts in response to tension forces applied to the tether 80 in a manner similar or identical to a slip knot or noose. As described below, the looped configuration of the tether 80 acts as a drawstring for drawing closed the vent opening 52.

The loop 86 may be formed in any manner suited to achieve this function. For example, the apparatus 10 may include means, illustrated schematically at 92 in FIGS. 3 and 4, for linking portions of the tether 80 to each other to form the loop 86. In this example, the means 92 may comprise a coupler, ring, collar, grommet, tied or sewn knot (e.g., slip knot). In one particular example, the means 92 may comprise a terminal end portion of the tether that is formed as a small loop through which the remainder of the tether may extend to form a cinch or slip knot.

As an alternative to implementing the means 92, a terminal end of the second end portion 84 of the tether 80 could be secured to the air bag material at or near the opening 70 by known means, such as stitching, ultrasonic welding, heat bonding, or adhesives. In this alternative configuration, the second end portion 84 of the tether 80 would extend from the connection with the air bag material through the channel 68, exiting the channel at the opening 70.

As another alternative, the loop 86 could be configured to have a fixed circumference, extending through the channel 68. In this instance, the shape of the loop 86 would become ovoid or slit-like when the tether 80 is tensioned, thus placing the vent 50 in the closed condition.

Configured as described above, the tether 80 cooperates with the channel 68 to serve as a drawstring that closes the vent, i.e., the vent opening 52, when the tether is tensioned. When the tether 80 is tensioned, the size or circumference of the loop 86 is reduced, which, because the loop extends through the channel 68, constricts or otherwise draws closed the vent opening 52. The tension applied to the tether 80 may thus actuate the vent 50 from a first, open condition (FIG. 4) to a second, closed condition (FIG. 3).

By actuating the vent 50 to the "closed" condition, it is meant that the size of the vent opening 52 is reduced to a degree sufficient to reduce the flow rate of inflation fluid through the vent 50. Those skilled in the art will appreciate that the vent 50, when in the closed condition, may still permit some degree of inflation fluid flow. The degree of inflation fluid flow through the vent 50 when in the closed condition is, however, less or substantially less than the degree of inflation fluid flow through the vent when in the open condition.

Referring to FIGS. 1 and 2, upon sensing the occurrence of an event for which inflation of the air bag 14 is desired, such as a vehicle impact or collision, a sensor 100 provides an actuation signal to the inflator 24 via lead wires 102. Upon actuation of the inflator 24, inflation fluid is directed into the air bag 14. The air bag 14 inflates and deploys under the pressure of inflation fluid provided by the inflator 24 from the stored position (14' in FIGS. 1 and 2) to the deployed position (14 in FIGS. 1 and 2). In the deployed position, the air bag 14 is positioned between the instrument panel 30 and the vehicle occupant 16. The air bag 14, when inflated, helps absorb impacts with the air bag and helps distribute the energy of impacts throughout the area of the air bag.

When the air bag 14 is placed in the deflated and stored condition, the vent 50 is left in the open condition (see FIG. 4). In the deflated and stored condition, the tether 80 is slacked between its first and second end portions 82 and 84. As the air bag 14 inflates and deploys, the panel 74 moves away from the instrument panel 30 and away from the vent 50, thus taking up the slack in the tether 80.

During inflation and deployment of the air bag 14, prior to the panel 74 moving a distance away from the instrument panel sufficient to tension the tether 80, the vent 50 remains in the open condition of FIG. 4. In the open condition, the vent 50 releases inflation fluid from the inflatable volume 26 of the air bag 14.

While the air bag inflates, some inflation fluid flows through the open vent 50. The vent 50, being located on a lateral or rear portion or panel 76 of the air bag 14, thus directs inflation fluid laterally or rearwardly (e.g., toward the instrument panel 30) from the air bag. As the panel 74 moves away from the instrument panel 30 and the vent 50, the slack in the tether 80 is completely taken up. When the panel 74 moves a predetermined distance away from the instrument panel 30, the tether becomes tensioned. This is shown in FIGS. 1 and 3.

The tether 80, when tensioned, actuates the vent from the open condition (FIG. 4) to the closed condition (FIG. 3). When this occurs, the looped second end portion 84 of the tether 80 draws closed the vent opening 52, as described above. This helps block inflation fluid flow through the vent 50 when the air bag 14 is fully deployed. Those skilled in the art will appreciate that movement of the panel 74 away from the instrument panel 30 tensions the tether 80. A certain degree of pressurization of the air bag 14 is not necessarily required to tension the tether 80 and close the vent 50.

The configuration of the vent 50 may thus facilitate pressurization of the air bag 14 because the vent 50 responds more rapidly to movement of the panel 74. Because closure of the vent 50 is predicated on movement of the panel, vent closure can be configured to occur at any desired time during inflation through selecting an appropriate length of the tether 80. For example, the vent 50 may be configured to close when the air bag reaches the fully deployed position of FIG. 1 by selecting the tether length shown in FIG. 1. Once the vent 50 is closed, the rate of air bag pressurization increases. Therefore, the point during deployment of the air bag 14 at which an increase in the rate of pressurization is desired can be selected by choosing the appropriate length for the tether 80.

Those skilled in the art will appreciate that the vent 50 of the present invention may be selectively actuated depending on conditions in the vehicle 12 when the apparatus 10 is actuated. For example, in FIG. 1, the occupant 16 is in a normal seated position restrained by a seatbelt 104. In this scenario, there is sufficient space between the occupant 16 and the instrument panel 30 for the air bag 14 to inflate and deploy fully. The panel 74 is thus permitted to move a distance away from the instrument panel 30 sufficient for the tether 80 to become tensioned and draw closed the vent opening 52. Thus, when the occupant 16 is in the normal seated and belted position of FIG. 1, the vent 50 becomes placed in the closed condition of FIG. 3. Because the vent is closed, the air bag 14 can deploy and pressurize rapidly. This helps the air bag 14 absorb and distribute the forces of impacts in a desired manner and helps provide a desired ride-down effect for the normally seated and belted occupant 16.

As another example, in FIG. 2, the occupant 16 is positioned away from the normal seated position. In this scenario, there is not sufficient space between the occupant 16 and the instrument panel 30 for the air bag 14 to inflate and deploy fully. The panel 74 is thus blocked from moving away from the instrument panel 30 a distance sufficient to tension the tether 80. Thus, when the occupant 26 is positioned away from the normal seated position, the vent 50 remains in the open condition of FIG. 4 and vents inflation fluid. Because of this venting, the air bag 14 may deploy and pressurize less rapidly than if the vent were closed. This helps the air bag 14 absorb and distribute the forces of impacts and helps provide a desired ride-down effect for the occupant 16 positioned away from the normal seated position. Those skilled in the art will appreciate that the vent 50 may remain in the open condition in the event that an object on the vehicle seat other than an occupant blocks or otherwise impedes deployment of the air bag 14.

Advantageously, the present invention allows for implementing the selective venting functions described herein in a manner that is cost effective in terms of materials and manufacturing. The vent opening 52 is formed with relatively simple cuts and connections (e.g., stitching) of the air bag material. The tether 80 may simply be a length of webbing or other suitable material. This affords a simple, cost effective alternative to comparatively expensive and complex air bag vent configurations that implement hinged doors, latches, actuators, and other components or mechanisms.

As another advantage, the vent 50 is placed in the closed position as a result of movement of the panel 74 during deployment of the air bag 14. The vent 50 may thus be closed rapidly in response to movement of the panel 74 instead of waiting until the air bag 14 becomes pressurized. Closure of the vent 50 may thus be achieved independently or substantially independently of air bag pressurization.

As another advantage, the configuration of the vent 50 of the present invention provides the capability to implement adaptive venting features in the air bag 14 based on occupant position. For example, in the case of an occupant in a normally seated position where the seat is at an extreme forward position, the length of the tether 80 may be selected such that the deploying air bag engages the occupant before the tether draws the vent 50 fully closed, leaving the vent opening 52 at a desired degree of closure between fully opened and fully closed. This may, for example, be the case with a small occupant seated in an extreme forward seat position. In this configuration, for an occupant having a seated position rearward of the forward seat position, the air bag 14 would not engage the occupant until after the tether draws the vent 50 fully closed. Also, in this configuration, the vent 50 would also be configured to remain fully open in the case of an occupant seated away from the normally seated position, as described above.

Because the vent opening 52 is formed in the air bag panel 88, the vent 50 is subjected directly to forces, such as tension, that are exerted on the air bag panel during inflation and deployment, impact, and ride down. These forces act in opposition to closure of the vent opening 52 and, thus, the closed condition of the vent 50. For a relatively large occupant, the forces exerted on the air bag panel 88 may be greater than those exerted on the panel by a smaller occupant.

The configuration of the vent 50 may be tailored in a variety of manners. For example, the means 92 for linking the portions of the tether 80 to each other to form the loop 86 may be configured to resist loosening or opening of the loop to a desired degree. As another example, the channel 68 may be configured to form a close or tight fit with the tether 80 to resist loosening or opening of the loop 86 to a desired degree. As a further example, the vent 50 may have any configuration suited to alter the degree to which the tether resists loosening or opening to a desired degree.

An apparatus 10a in accordance with a second embodiment of the present invention is illustrated in FIG. 6. The second embodiment of the present invention is similar to the first embodiment of the invention illustrated in FIGS. 1-5. Accordingly, reference numbers similar to those of FIGS. 1-5 will be utilized in FIG. 6, the suffix letter "a" being associated with the reference numbers of FIG. 6 to avoid confusion.

Referring to FIG. 6, according to the second embodiment, a portion 100 of the material forming the air bag 14a extending around the periphery 54a of the vent opening 52a is folded over onto an adjacent portion 102 of the air bag material on an inner surface 104 of the air bag. The portions 100 and 102 are interconnected by a connection 106 formed by known means, such as stitching, ultrasonic welding, heat bonding, or adhesives. As shown in FIG. 6, the overlying portions 100 and 102, when interconnected by the connection 106, help define a passage or channel 108 that extends about the periphery 54a of the vent opening 52a and receives the tether 80a.

FIGS. 7 and 8 illustrate by way of example a construction of the air bag 14 in which either of the vents 50 or 50a of FIGS. 1-6 may be implemented. The air bag 14 of FIG. 7 is a passenger front impact air bag similar or identical to that shown in FIGS. 1 and 2. As shown in FIG. 7, the air bag 14 includes a front panel 120, a rear panel 140, and first and second side panels 160 and 180, respectively.

The front panel 120 includes first and second longitudinal edge portions 122 and 124, respectively, and opposite end portions 126 and 128, respectively. The rear panel 140 includes first and second longitudinal edge portions 142 and 144, respectively, and opposite end portions 146 and 148, respectively. The first and second side panels 160 and 180 have curved and contoured generally L-shaped configurations. The first side panel 160 has a front edge portion 162, a rear edge portion 164, a top edge portion 166, and a bottom edge portion 168. The second side panel 180 has a front edge portion 182, a rear edge portion 184, a top edge portion 186, and a bottom edge portion 188.

A portion 130 of the front panel defines the location at which the first end 82 of the tether 80 (see FIGS. 3 and 4) is connected. The rear panel 140 includes a mouth portion 150 that extends about a periphery of an opening or mouth 152 of the rear panel. The rear panel 140 also includes apertures 154 for receiving fasteners (not shown) for connecting the air bag 14 to the air bag module 20 (see FIGS. 1 and 2). This facilitates connecting the air bag 14 with the air bag module 20 and directing inflation fluid into the air bag through the mouth 152. The rear panel 140 also includes the vent opening 52 of the air bag 14 and thus defines the panel 88 described above in regard to FIGS. 3 and 4. The fabric piece 60 is thus connectable to with the rear panel 140, via the connections 66 (FIG. 8) as described above, to define the channel for receiving the tether.

The panels 120, 140, 160, and 180 are interconnected by known means, such as stitching, ultrasonic welding, heat bonding, or adhesives, to assemble the air bag 14. Referring to FIG. 8, the end portions 126 and 128 and 146 and 148 of the front and rear panels 120 and 140, respectively, are interconnected via connections 210 to form an endless loop of material 200. The loop of material 200 has a first edge 202 defined by the first longitudinal edges 122 and 142 of the front and rear panels 120 and 140 and a second edge 204 defined by the second longitudinal edges 124 and 144 of the front and rear panels.

As indicated generally by the assembly lines in FIG. 8, the first and second side panels 160 and 180 are interconnected with the first and second edges 202 and 204, respectively, of the loop of material 200. In the embodiment of FIGS. 7 and 8, the front and rear panels 120 and 140 have respective lengths configured such that the lengths of the first and second edges 202 and 204 of the loop of material 200 are equal to or about equal to the lengths of the peripheries of the side panels 160 and 180 to which they are interconnected. The loop of material 200 and the first side panel 160 are connected along overlying portions of the first edge 202 of the loop and the front edge portion 162, rear edge portion 164, top edge portion 166, and bottom edge portion 168 of the first side panel. The loop of material 200 and the second side panel 180 are connected along overlying portions of the second edge 204 of the loop and the front edge portion 182, rear edge portion 184, top edge portion 186, and bottom edge portion 188 of the second side panel.

Figure 9:
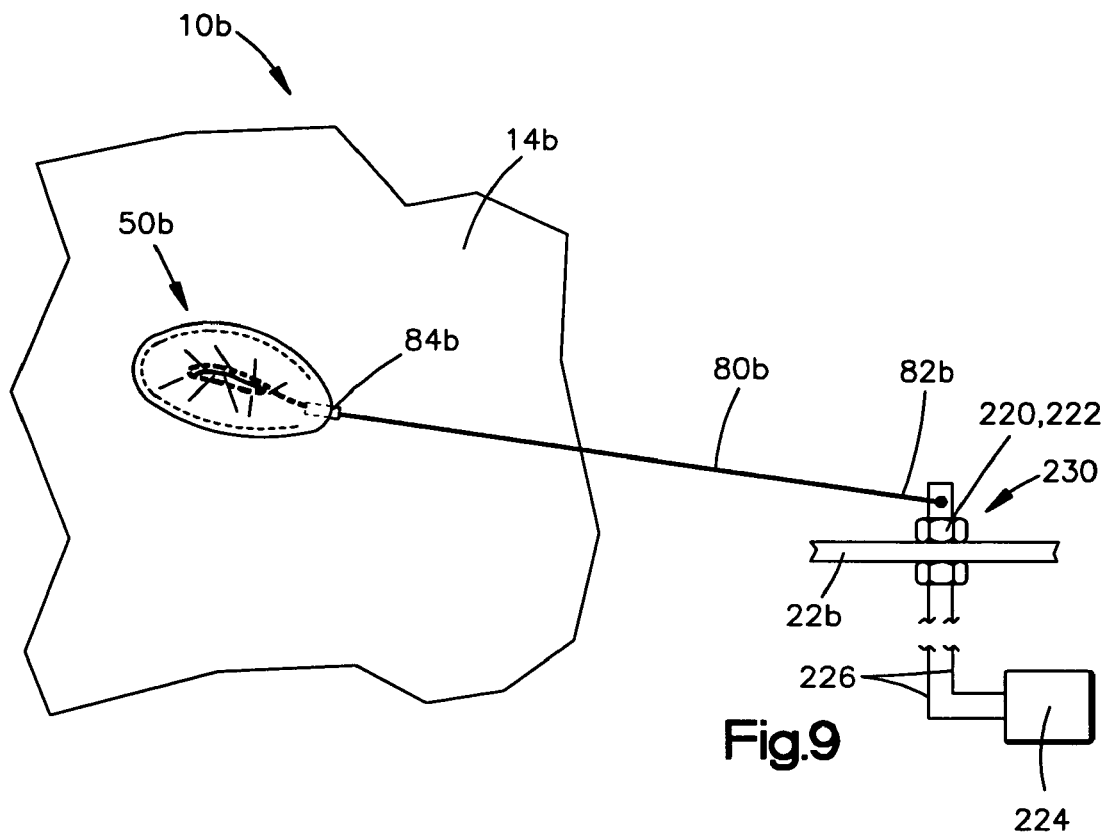
FIGS. 9 and 10 are plan views illustrating a portion of the apparatus according to a third embodiment of the present invention.
Figure 10:
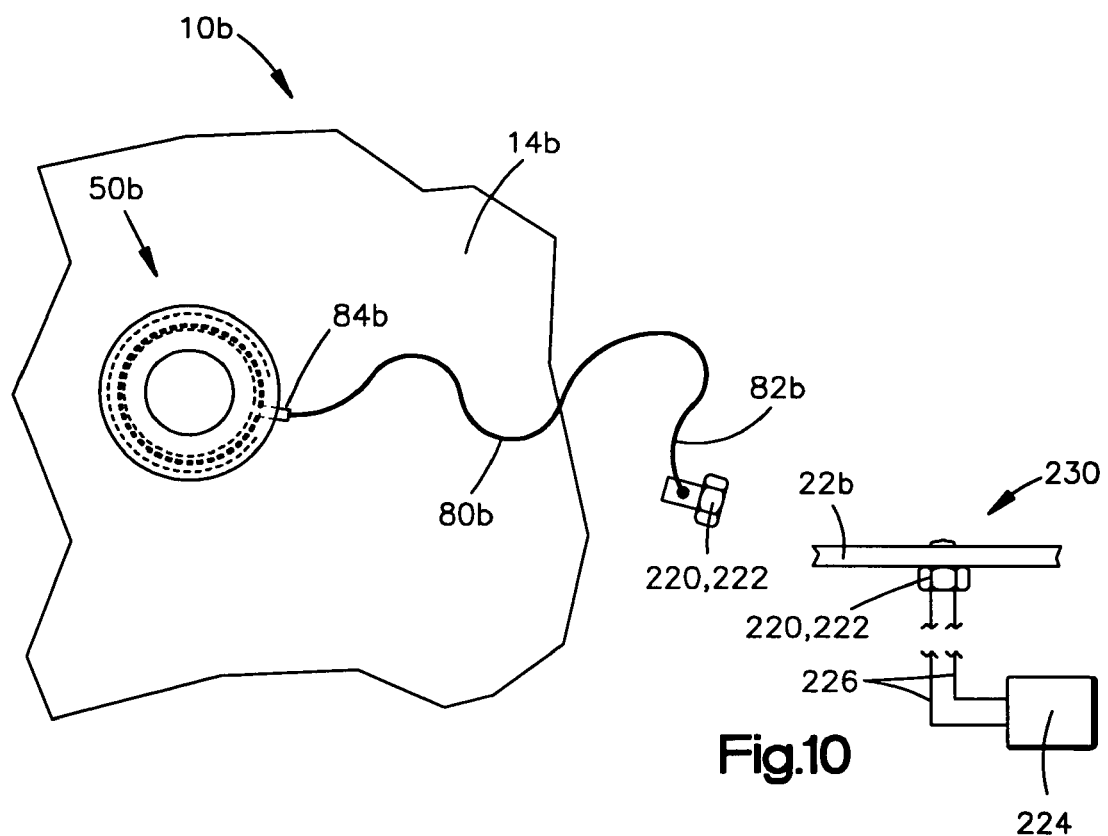

An apparatus 10b in accordance with a third embodiment of the present invention is illustrated in FIGS. 9 and 10. The third embodiment of the present invention is similar to the embodiments of the invention illustrated in FIGS. 1-8. Accordingly, reference numbers similar to those of FIGS. 1-8 will be utilized in FIGS. 9 and 10, the suffix letter "b" being associated with the reference numbers of FIGS. 9 and 10 to avoid confusion.

Referring to FIGS. 9 and 10, the tether 80b has a first end portion 82b connected with a stationary member at a location 230 spaced away from the vent 50b. In the embodiment of FIGS. 9 and 10, the first end 82b could be connected to the housing 22b. The first end portion 82b could, however, be connected to an alternative stationary member, such as a structural member of the vehicle, e.g., the instrument panel (not shown). In this configuration, the second end portion 84b of the tether 80b, being associated with the vent 50b, moves away from the first end portion 82b during deployment of the air bag 14b. This relative movement of the first and second end portions 82b and 84b thus may selectively tension the tether 80b and thereby close the vent 50b in a manner similar or identical to that described above in regard to the embodiments of FIGS. 1-8.

In the embodiment of FIGS. 9 and 10, the second end portion 82b of the tether 80b is secured to the housing 22b via a fastener 220. The fastener 220 may be a common fastener, such as a bolt, or, as shown in FIGS. 9 and 10, may be an actuatable fastener 222. As shown in FIGS. 9 and 10, the actuatable fastener 222 is operatively connected to one or more sensors 224 by means 226, such as lead wires. The sensors 224 are operative to actuate the actuatable fastener 222 in response sense vehicle or occupant conditions to help control actuation of the vent 50. For example, the sensors 224 may be operative to actuate the actuatable fastener 222 in response to sensed occupant conditions, such as weight, size, position, or proximity to the apparatus 10b. The sensors 224 may also be operative to actuate the actuatable fastener 222 in response to sensed vehicle conditions, such as a sensed seat position or seatbelt latch condition.

Referring to FIG. 9, the air bag 14b is illustrated in the normally deployed condition with the vent 50b in the closed condition and the actuatable fastener 222 in a normal or non-actuated condition. This may occur, for example, when the air bag 14b is deployed and the sensors 224 do not sense any vehicle or occupant conditions for which the vent 50b should remain in the open condition. In this event, the vent 50b is placed in the closed condition in response to movement of the air bag 14b away from the location 230. This movement tensions the tether 80b, which closes the vent 50b by drawing closed or cinching the vent as described above.

Referring to FIG. 10, the air bag 14b is illustrated in a deployed condition with the vent 50b in the closed condition and the actuatable fastener 222 in an actuated condition. This may occur, for example, when the air bag 14b is deployed and the sensors 224 sense one or more vehicle or occupant conditions for which the vent 50b should remain in the open condition. In this event, the actuatable fastener 222, being in the actuated condition, ruptures or breaks, which disconnects the second end portion 82b of the tether 80b from the housing 22b. As a result, movement of the air bag 14b away from the location 230 does not tension the tether 80b and the vent 50b is not drawn or cinched closed.

From the above description of the invention, those skilled in the art will perceive improvements, changes, and modifications. For example, the inflatable vehicle occupant protection device may have a configuration other than that of the air bag described herein. For example, the present invention may be used in conjunction with an alternative inflatable vehicle occupant protection device, such as an inflatable seat belt, an inflatable knee bolster, an inflatable head liner, an inflatable curtain, or a knee bolster operated by an inflatable air bag. Such improvements, changes, and modifications within the skill of the art are intended to be covered by the appended claims.

Having described the invention, the following is claimed:

1. An apparatus for helping to protect an occupant of a vehicle, the apparatus comprising:
    an inflatable vehicle occupant protection device inflatable to an inflated condition for helping to protect the vehicle occupant, the protection device comprising a panel of material that helps define an inflatable volume of the protection device, the panel including a vent opening that has an open condition for venting inflation fluid from the inflatable volume, the vent opening being in the open condition during initial deployment of the protection device;
    a channel that encircles the vent opening, the channel being at least partially defined by a peripheral portion of the panel that extends along a periphery of the vent opening; and
    a tether having a first end connected with the protection device at a location spaced from the vent opening and a second end extending through the channel and coupled to a portion of the tether between the first end and the second end to form a loop, the tether drawing together the peripheral portion of the panel to reduce the size of the vent opening when the protection device deploys a predetermined distance toward the inflated condition.

2. The apparatus of claim 1, wherein the panel in which the vent opening is formed is subjected to tensile forces resulting from fluid pressures in the inflatable volume, the tether being coupled to the panel such that the tensile forces acting on the panel are imparted to the tether in a direction in opposition to closure of the vent opening.

3. The apparatus of claim 1, wherein the inflatable vehicle occupant protection device deploys the predetermined distance as the inflatable vehicle occupant protection device reaches a fully deployed position.

4. The apparatus of claim 1, wherein the inflatable vehicle occupant protection device is an inflatable air bag.

5. The apparatus of claim 1, wherein the circumference of the loop is reduced in response to tension in the tether when the vehicle occupant protection device deploys the predetermined distance, the reduced circumference of the loop reducing the size of the vent opening.

6. The apparatus of claim 5, wherein the loop is configured to function in the manner of a slip knot so as to constrict when the tether is tensioned to draw closed the vent opening.

7. The apparatus of claim 1, wherein the tether is positioned in the inflatable volume when the protection device is in the inflated condition.

8. The apparatus of claim 1, wherein the peripheral portion of the panel is folded over and interconnected with adjacent portions of the panel to form the channel.

9. The apparatus of claim 1, further comprising a piece of material interconnected with the peripheral portion of the panel to form the channel.

10. The apparatus of claim 9, wherein the piece of material has a ring-shaped configuration that helps provide a ring-shaped configuration of the channel.

11. The apparatus of claim 9, wherein portions of the piece of material are left disconnected from the panel of the protection device to define an opening through which the tether may enter the channel.

12. The apparatus of claim 1, wherein the vent opening is configured to close in response to deployment of the protection device independently of pressurization of the protection device.

13. The apparatus of claim 1, wherein the tether has an end portion opposite the portion extending through the channel, the end portion being secured to a panel of the protection device.

14. The apparatus of claim 1, wherein the tether has an end portion opposite the portion extending through the channel, the end portion being secured to a stationary member in the vehicle.

15. The apparatus of claim 14, wherein the stationary member comprises a housing for supporting the protection device.

16. The apparatus of claim 1, wherein the tether has an end portion opposite the portion extending through the channel, the apparatus further comprising an actuatable fastener for securing the end portion to the vehicle.

17. The apparatus of claim 16, wherein the actuatable fastener is actuatable in response to at least one of sensed vehicle and occupant conditions, the actuatable fastener, when actuated, releasing the end portion of the tether to help prevent the tether from drawing together the peripheral portion of the panel to reduce the size of the vent opening.

18. An apparatus for helping to protect an occupant of a vehicle, the apparatus comprising:
    an inflatable vehicle occupant protection device inflatable to an inflated condition for helping to protect the vehicle occupant, the protection device comprising a panel of material that helps define an inflatable volume of the protection device, the panel including a vent opening that has an open condition for venting inflation fluid from the inflatable volume, the vent opening being in the open condition during initial deployment of the protection device; and
    a tether having a portion that encircles the vent opening, the tether being configured to draw closed the vent opening when the protection device deploys a predetermined distance toward the inflated condition;
    the panel being subjected to tensile forces resulting from fluid pressures in the inflatable volume, the tether being coupled to the panel such that the tensile forces acting on the panel are imparted to the tether to cause the vent to reopen.

* * * * *

UNITED STATES PATENT AND TRADEMARK OFFICE
CERTIFICATE OF CORRECTION

PATENT NO. : 7,607,689 B2 Page 1 of 1
APPLICATION NO. : 11/494346
DATED : October 27, 2009
INVENTOR(S) : Kalczynski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 446 days.

Signed and Sealed this

Twelfth Day of October, 2010

David J. Kappos
*Director of the United States Patent and Trademark Office*